No. 862,027. PATENTED JULY 30, 1907.
F. A. SMITH.
MINER'S LAMP.
APPLICATION FILED JUNE 23, 1906.
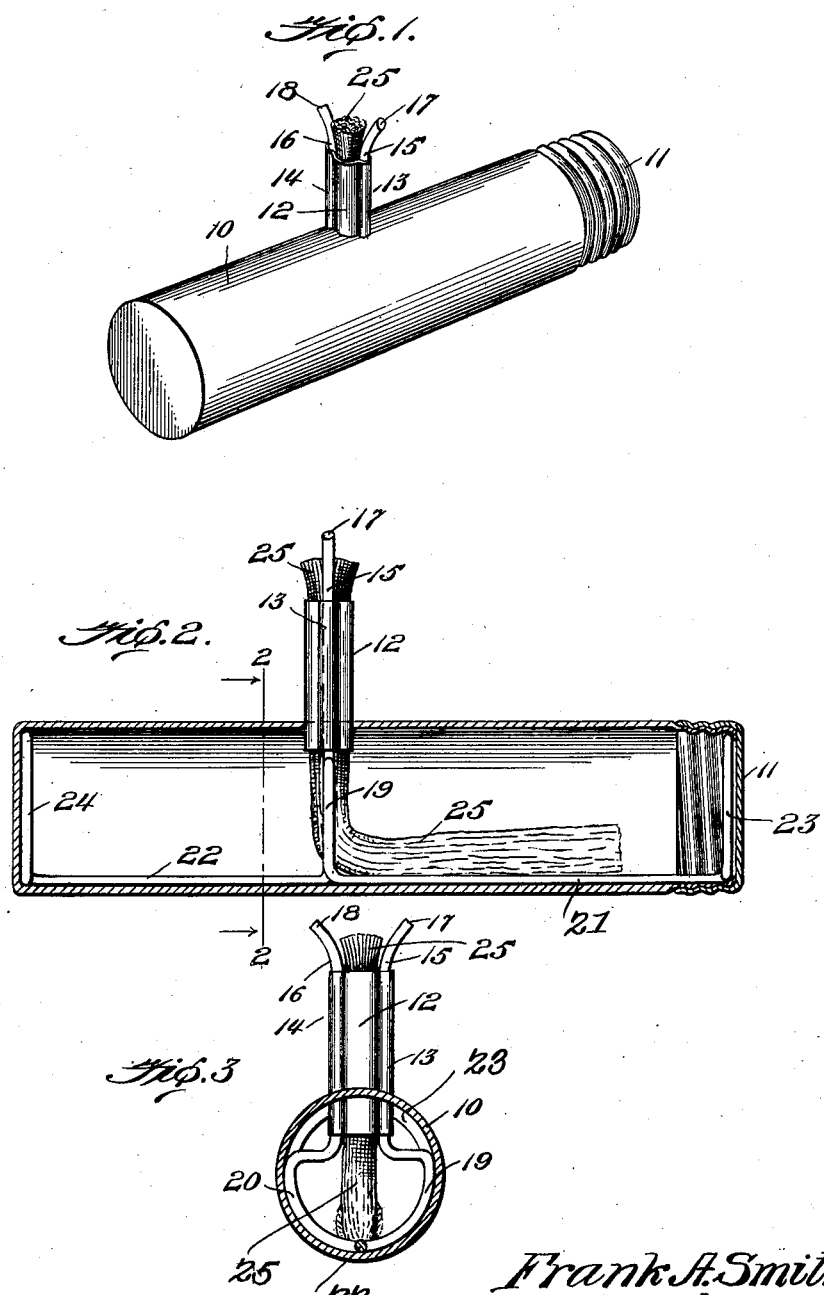
WITNESSES:
Frank A. Smith
INVENTOR
By C. A. Snow & Co
ATTORNEYS

UNITED STATES PATENT OFFICE.

FRANK A. SMITH, OF VICTOR, COLORADO.

MINER'S LAMP.

No. 862,027.  Specification of Letters Patent.  Patented July 30, 1907.

Application filed June 23, 1906. Serial No. 323,109.

*To all whom it may concern:*

Be it known that I, FRANK A. SMITH, a citizen of the United States, residing at Victor, in the county of Teller and State of Colorado, have invented a new and useful Miner's Lamp, of which the following is a specification.

This invention relates to lamps in which paraffin, lard oil, tallow, and similar luminants are employed, which require a certain degree of heat to melt them as they are consumed, and has for its object to improve the construction and increase the efficiency and utility of devices of this character.

With these and other objects in view which will appear as the nature of the invention is better understood, the invention consists in certain novel features of construction as hereafter fully described and claimed.

In the accompanying drawings forming a part of this specification and in which corresponding parts are denoted by like designating characters, is illustrated the preferred form of the embodiment of the invention capable of carrying the same into practical operation.

In the drawings:—Figure 1 is a perspective view of the improved device complete, except the hangers or supports. Fig. 2 is a longitudinal section. Fig. 3 is a transverse section on the line 2—2 of Fig. 2.

Lamps of the character herein shown and described are usually employed by miners, tunnel operators, and other workmen employed in underground and like constructions, and consists in a receptacle 10, preferably cylindrical in shape, and having a screw cap 11 forming a closure for one end thereof. Extending from one side of the receptacle intermediate its ends is a wick tube 12 provided with longitudinal recesses 13—14 disposed one on each side of the tube and communicating with the interior of the tube and receptacle, as shown. Disposed in these recesses 13—14 are heating elements 15—16 composed of a material, preferably metal, which is a rapid conductor of heat, copper wire being usually employed for this purpose, the heating medium extended upwardly above the wick tube and inclined outwardly in opposite directions as at 17—18. The heating medium is extended into the interior casing and encircle its inner walls opposite the wick tube as at 19—20, and is then extended longitudinally of the casing along its lower inner surface as at 21—22, and thence curved around the interior of the casing at the opposite ends as at 23—24. By this means the heating medium extends into every part of the interior of the casing, and provides a relatively extended heating surface which comes in contact with a correspondingly extended area of the lubricant disposed in the casing. The wick, indicated at 25, comes directly in contact with the portions 15—16 of the heating medium, and is heated thereby. The projecting ends 17—18 are in direct contact with the flame of the lamp, and highly heated thereby, the heat being conducted thence throughout the whole length of the heating medium and communicated to the lubricant within the casing, and melts the same as fast as it is absorbed by the wick. The heating medium is thus constructed in two parts, the portions 15, 17, 19, 21 and 23 constituting one part, and the portions 16, 18, 20, 22 and 24 constituting the other part, the two parts being exact duplicates, and arranged within the casing at opposite sides of the wick tube. Thus in manufacturing the device the heater portions of the lamp can be manufactured in quantities, and of the same form, requiring but one set of bending implements or dies to construct them, and then assembling them within the casings by simply employing two of the parts to each lamp. The expense of manufacturing and the simplicity of the construction is thereby materially lessened, as will be obvious.

Any suitable supporting means may be employed either attached to or associated with the casing, such as spurs, hooks and the like, but as these attachments are so well known, it is not deemed necessary to illustrate them, as they form no part of the present invention.

Having thus described the invention, what is claimed as new is:—

1. A device of the class described comprising a hollow receptacle having a wick tube extending therefrom and provided with oppositely disposed longitudinal recesses communicating with the interior of the tube and receptacle, respectively, heating members seated in said recesses and disposed in contact with the wick, said heating members having their lower portions at the base of the tube bent laterally in engagement with the interior walls of the receptacle and thence extended longitudinally of said receptacle and bent to form terminal coils, the upper ends of the heating members being extended above the wick and deflected laterally on each side thereof with their terminals disposed in alinement with the longitudinal axis of the wick.

2. A device of the class described comprising a receptacle having a removable closure at one end thereof and provided with a laterally extending wick tube the walls of which are bent to form oppositely disposed longitudinal recesses communicating with the interior of the tube and receptacle, respectively, heating members seated within said recesses and each having one end thereof extended within the receptacle and provided with a terminal coil, one of the coils being disposed in contact with the adjacent end of the receptacle and the other coil in contact with the closure, the opposite ends of said heating members being extended above the wick and deflected laterally on each side thereof with their terminals disposed in alinement with the longitudinal axis of the wick.

In testimony that I claim the foregoing as my own, I have hereto affixed my signature in the presence of two witnesses.

FRANK A. SMITH.

Witnesses:
 B. F. ZIMMERMAN,
 EMIL ERICSON.